United States Patent [19]
Metzger, Jr. et al.

[11] Patent Number: 5,287,780
[45] Date of Patent: Feb. 22, 1994

[54] RADIAL ARM SAW GUARD WITH OPERATIONAL INTERLOCK

[75] Inventors: James I. Metzger, Jr., Ballwin; Jack E. Hyde, Jr., St. Peters; Robert E. Steiner, Chesterfield, all of Mo.

[73] Assignee: Emerson Electric Co., St. Louis, Mo.

[21] Appl. No.: 31,345

[22] Filed: Mar. 15, 1993

[51] Int. Cl.$^5$ .......................... B27B 5/20; B27G 19/08
[52] U.S. Cl. ...................... 83/102.1; 83/100; 83/399; 83/471.3; 83/478; 83/486.1; 83/DIG. 1
[58] Field of Search .............. 83/102.1, 399, 471.3, 83/473, 477.1, 478, 486.1, 489, 521, DIG. 1, 100

[56] References Cited

U.S. PATENT DOCUMENTS

| | | | |
|---|---|---|---|
| 3,596,033 | 7/1971 | Wickham | 200/168 |
| 3,880,032 | 4/1975 | Green | 83/102 |
| 3,884,101 | 5/1975 | Silkin | 83/544 |
| 3,913,437 | 10/1975 | Speer et al. | 83/478 |
| 4,043,237 | 8/1977 | Pyle | 83/478 |
| 4,150,598 | 4/1979 | Berends et al. | 83/478 |
| 4,176,571 | 12/1979 | Batson | 83/397 |
| 4,532,841 | 8/1985 | Stackhouse, Jr. | 83/102.1 |
| 4,553,462 | 11/1985 | Silken | 83/471.3 |
| 4,875,398 | 10/1989 | Taylor et al. | 83/478 |
| 4,958,544 | 10/1990 | Miyamoto | 83/471.3 |
| 5,181,447 | 1/1993 | Hewitt | 83/478 |
| 5,199,343 | 4/1993 | O'Banion | 83/397 |

Primary Examiner—Hien H. Phan
Attorney, Agent, or Firm—Polster, Lieder, Woodruff & Lucchesi

[57] ABSTRACT

A radial arm saw guard with operational interlock and adjustable outfeed user barrier is disclosed. The radial saw includes a motor driven saw blade that is mounted on a yoke depending from a supporting arm that overhangs a worktable. The motor driven saw blade is movable relative to a worktable mounted fence in order to enable the motor driven saw blade to be operated for rip cutting of workpieces longitudinally relative to the fence and for cross cutting transverse relative to the fence. A blade guard is mounted in fixed position relative to the yoke for covering at least approximately an upper half of the motor driven saw blade. An adjustable outfeed user barrier is mounted to the upper blade guard for operation between an upper disengaged position exposing the motor driven saw blade and a lower engaged position covering an outfeed end of the motor driven saw blade to protect a user during rip cutting. An interlock prevents rip cutting by the motor driven saw blade unless the adjustable outfeed user barrier is in its lower engaged position. The adjustable outfeed user barrier, in addition to being adjustable for workpieces of different thickness, is also adjustable for accommodating motor driven saw blades of different diameter.

15 Claims, 5 Drawing Sheets

RADIAL ARM SAW GUARD WITH OPERATIONAL INTERLOCK

CROSS REFERENCE TO RELATED APPLICATIONS

This is a copending application to Ser. No. 08/031,344, dated Mar. 15, 1993 entitled RADIAL SAW SAFETY GUARDS AND BARRIERS, and Ser. No. 08/038,681, dated Mar. 15, 1993 entitled INDEPENDENTLY AND JOINTLY OPERABLE RADIAL SAW GUARDS, both assigned to the same assignee as the present invention.

BACKGROUND OF THE INVENTION

The present invention relates to a radial arm saw guard with operational interlock and an adjustable outfeed user barrier, and more particularly, to an operational interlock that prevents rip cutting by a motor driven saw blade unless an adjustable outfeed user barrier is in a lower engaged position, as well as to an adjustable outfeed user barrier which is adjustable to workpieces of different thickness and for accommodating motor driven saw blades of different diameter.

Typically, a radial saw is mounted on a supporting arm that overhangs a worktable. The supporting arm is mounted at an upper end of a base or column that extends upwardly from one end of a worktable. A motor driven saw blade is pivotally and slidably mounted to the supporting arm for operating the motor driven saw blade in rip cutting workpieces longitudinally along the length of a rip fence or for cross cutting of workpieces transverse to the rip fence.

Because the radial saw is operated in fixed and moving relationship in two different directions for rip cutting and cross cutting, different safety hazards can arise from improper use of the radial saw. In order to fully appreciate the nature of the safety hazards involved in rip cutting and cross cutting, it is important to understand the nature of the rip cutting and cross cutting operations. Rip cutting involves the changing of the width of a workpiece by cutting along its length. The workpiece is fed into the motor driven saw blade, which rotates in a fixed position, parallel to a rip fence, and at a set distance from the rip fence, enabling the fence to serve as a guide for the workpiece to be cut. Cross cutting, on the other hand, is cutting a workpiece to length. The workpiece is held firmly against the workpiece fence, and the blade is pulled through the workpiece to make the cut. Straight, bevel, miter and compound cuts can be made.

The safety hazards associated with rip cutting include outfeed zone hazard, kickback and wrong way feeding. If the operator reaches around the blade to the outfeed side and tries to hold or pull the workpiece through, the rotational force of the blade can pull the hand back into the blade. Therefore, touching, holding or pulling on the outfeed of a workpiece, while the blade is still spinning, can result in fingers, hand or an arm being cut off. Kickback occurs when a blade is pinched or bound by a workpiece. This can result in the work being thrown out of the radial saw in the direction of a user causing personal injury. Wrong way feed is an attempt to feed the workpiece into the outfeed side of the blade. Rotational force can pull the workpiece into the blade if the workpiece is fed in the same direction as the blade rotates. As a result, hands and fingers could be pulled along with the workpiece into the spinning blade before the user can let go or pull back. Not only can fingers, hand or an arm be cut off, but a propelled workpiece could injure a bystander.

Cross cutting safety hazards include exposed blade teeth, rolling carriage and thrown workpiece. During cross cutting, blade teeth can be exposed which if contacted can result in potential damage to the fingers, hand or arm of a user. Rolling carriage hazard occurs when the spinning blade inadvertently touches a workpiece or is lowered into the table causing the blade to suddenly come forward. This creates a risk to the user whose hands may be in the path of the blade. Finally, thrown workpiece hazard occurs when a workpiece is picked up by a spinning blade and thrown. A user or bystander could be hit by the thrown workpiece.

As will be understood from the discussion that follows, the present invention employs numerous safety and operational features in a radial saw which overcome many of the rip cutting and cross cutting hazards to which a user can be exposed through improper operation of the saw. As a result, the difference of the present invention from the prior art designs will be readily apparent to those skilled in the art.

In prior copending U.S. Pat. application Ser. No. 08/031,344 filed Mar. 15, 1993 entitled "RADIAL SAW SAFETY GUARDS AND BARRIERS", numerous safety and operational features in a radial saw have been disclosed. The present invention discloses some of the same features as in the aforementioned copending application, but also includes an operational interlock to prevent operation of the saw for rip cutting unless an adjustable outfeed user barrier is in a lower engaged position. The present invention also discloses an adjustable outfeed user barrier which is adjustable not only for workpieces of different thickness, but is also adjustable for motor driven saw blades of different diameter. Other safety features are employed in connection with the operational interlock and adjustable outfeed user barrier in order to overcome many of the rip cutting and cross cutting hazards to which a user and bystander may be exposed.

SUMMARY OF THE INVENTION

Among the several objects and advantages of the present invention include:

The provision of a new and improved radial arm saw guard with operational interlock that prevents rip cutting unless an adjustable outfeed user barrier is in its lower engaged position;

The provision of the aforementioned radial arm saw guard with an adjustable outfeed user barrier that engages the interlock, unless the adjustable outfeed user barrier is in its lower engaged position;

The provision of the aforementioned radial arm saw guard in which the adjustable outfeed user barrier is not only adjustable for accommodating workpieces of different thickness, but is also adjustable to accommodate motor driven saw blades of different diameter;

The provision of the aforementioned radial arm saw guard in which the adjustable outfeed user barrier includes an adjustable riving knife and anti-kickback pawls which are constructed to fit within and on opposite sides of a workpiece kerf, respectively, during rip cutting;

The provision of the aforementioned radial arm saw guard in which the anti-kickback pawls associated with the riving knife include gage rollers to assure proper adjustment;

The provision of the aforementioned radial arm saw guard which includes anti-kickback pawls at an outfeed end and also at an infeed end, in conjunction with an adjustable hold down at the infeed end of the radial saw;

The provision of the aforementioned radial arm saw guard which include other specific safety guards and barriers to protect the user against injury or damage during rip cutting and cross cutting; and The provision of the aforementioned radial arm saw guard with improved passive and active safety features that are reliable and durable in operation when properly used, incorporate easy to understand user friendly designs, and are otherwise well adapted for the purposes intended.

Briefly stated, the present invention discloses a radial saw for rip cutting and cross cutting that includes a motor driven saw blade mounted on a yoke depending from a supporting arm that overhangs a worktable. The motor driven saw blade is movable relative to a worktable mounted fence to enable the motor driven saw blade to be operated for rip cutting of workpieces longitudinally relative to the fence and for cross cutting transverse relative to the fence. A blade guard is mounted in fixed position relative to a motor that is mounted in the yoke for covering at least approximately an upper half of the motor driven saw blade. The motor driven saw blade, upper blade guard and motor are movable relative to the yoke for bevel cuts. Adjustable outfeed user barrier means are mounted to the upper blade guard for operation between an upper disengaged position exposing the motor driven saw blade and a lower engaged position covering the outfeed of the motor driven saw blade to protect a user during rip cutting. Interlock means are employed for preventing rip cutting by the motor driven saw blade unless the adjustable outfeed user barrier is in its lower engaged position.

The adjustable outfeed user barrier engages the interlock means to prevent rip cutting by the motor driven saw blade. Specifically, the yoke is rotatably mounted to the supporting arm for rip cutting and cross cutting operations by the motor driven saw blade, and the interlock means includes an actuator arm that is pivotally mounted on the yoke and positioned to engage the adjustable outfeed user barrier when located in an upper disengaged position to prevent rotation of the yoke to a position that enables rip cutting by the motor driven saw blade. The actuator arm is moved toward the adjustable outfeed user barrier when the yoke is rotated for rip cutting and away from the adjustable outfeed user barrier when the yoke is rotated for cross cutting. The actuator arm itself is pivotally mounted to the yoke and is moved toward and away from the adjustable outfeed user barrier by cam means associated with the rotation of the yoke. Also, the actuator arm is curved so that it performs the interlock function through a range of bevel angles.

The adjustable outfeed user barrier comprises a riving knife that is adjustably mounted to the fixed blade guard. The riving knife is adjustable relative to a mounting bracket secured to the fixed blade guard, the mounting bracket including elongated slots having fasteners extending therethrough which are mounted to the fixed blade guard for adjustably positioning the riving knife within a workpiece kerf behind the motor driven saw blade during rip cutting.

The riving knife includes an elongated slot that extends downwardly and away from the motor driven saw blade. The downwardly and outwardly extending riving knife elongated slot also has a fastener extending therethrough which is mounted to the sliding bracket for adjusting the riving knife relative to motor driven saw blades of different diameter.

The riving knife further includes a second elongated generally vertically directed slot for receiving outfeed anti-kickback pawls on opposite sides of the riving knife. The outfeed anti-kickback pawls are mounted on a fastener extending through the second elongated slot for adjustably positioning the outfeed anti-kickback pawls relative to workpieces of different thickness. The outfeed anti-kickback pawls are operatively associated with a gage roller for assisting in properly positioning the outfeed anti-kickback pawls on a workpiece.

An adjustable hold down may also be mounted to the fixed blade guard opposite to the riving knife, in order to accommodate workpieces of different thickness and prevent them from being lifted off of the worktable. The adjustable hold down includes an elongated slot which cooperates with the fastener extending therethrough that is mounted to the fixed blade guard for the adjustable positioning of the hold down relative to workpieces. The adjustable hold down at its lower end also may be provided with infeed anti-kickback pawls to assist in preventing a workpiece from being thrown back toward the user. The adjustable hold down is also configured to receive and collect saw dust for carrying same upwardly into the fixed blade guard, for removal through an exhaust port in the fixed blade guard.

These and other objects and advantages of the present invention will become apparent from the description that follows.

BRIEF DESCRIPTION OF THE DRAWINGS

In the drawings.

Corresponding reference numerals will be used throughout the several figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what we presently believe is the best mode of carrying out the invention.

Figure 1:
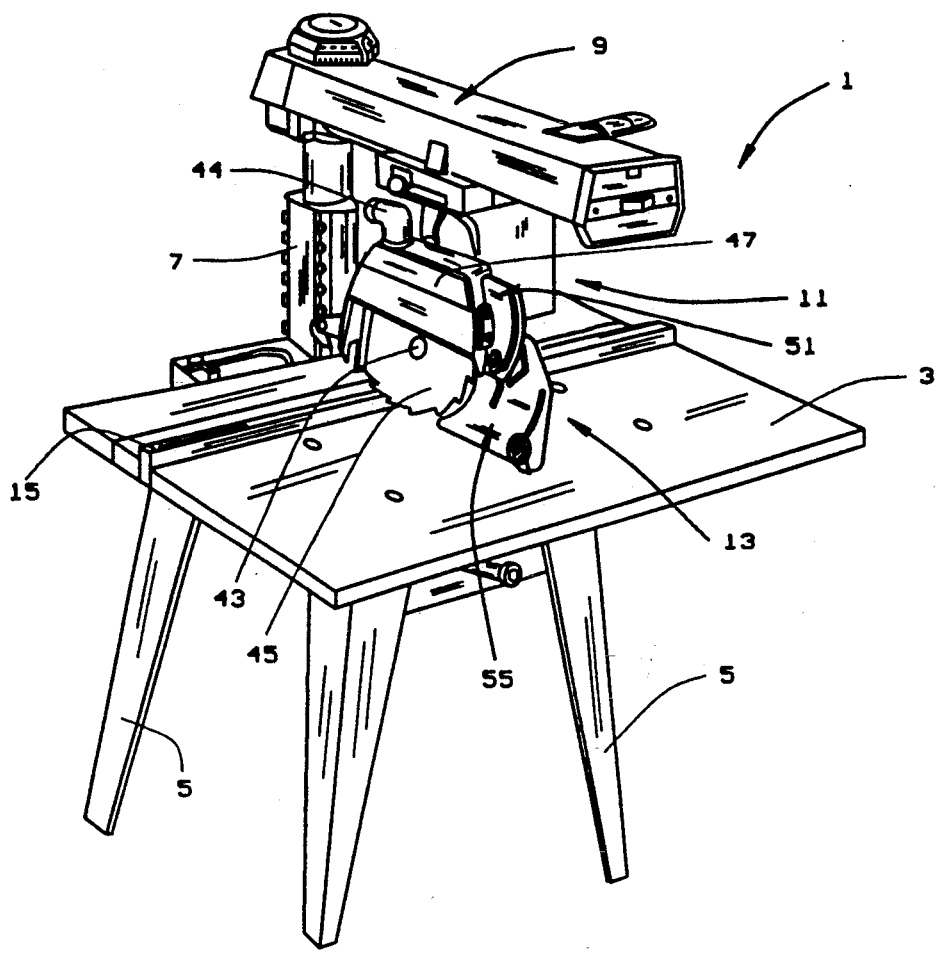
FIG. 1 is an enlarged perspective view of a radial saw employing a safety guard with operational interlock and an adjustable outfeed user barrier that is constructed in accordance with the teachings of the present invention.

The radial saw 1 that is illustrated in FIG. 1 of the drawings includes a horizontally extending worktable 3 that is supported by a plurality of legs 5, in a typical manner. Adjacent one side of the worktable 3, there is a base or column 7 which extends upwardly in order to secure a supporting arm 9 a predetermined distance above the worktable 3. The supporting arm 9, in turn, supports a rotatably and slidably mounted yoke 11 for moving the radial saw assembly 13 in position relative to the worktable mounted fence 15 for rip cutting or cross cutting, as desired. The worktable supported fence 15 can be mounted in a front fence position as shown in FIG. 1 or in a rear fence position (not shown) where the worktable mounted fence 15 is located adjacent the base or column 7 at one edge of the worktable 3 or in a third position where the fence 15 is positioned between the rearmost and the second of the three sections shown of the worktable 3.

Figure 7:
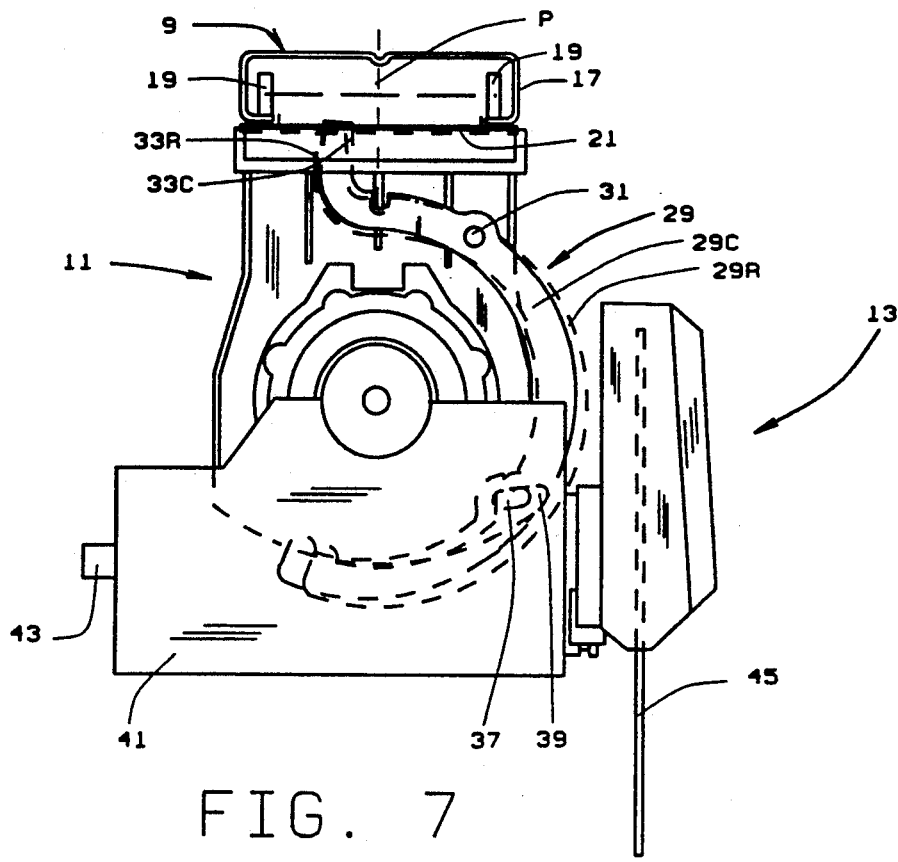
FIG. 7 is a side elevational view of the operational interlock employed in the yoke that depends from a supporting arm, the yoke mounting the motor and radial arm saw guard of the present invention.
Figure 8:
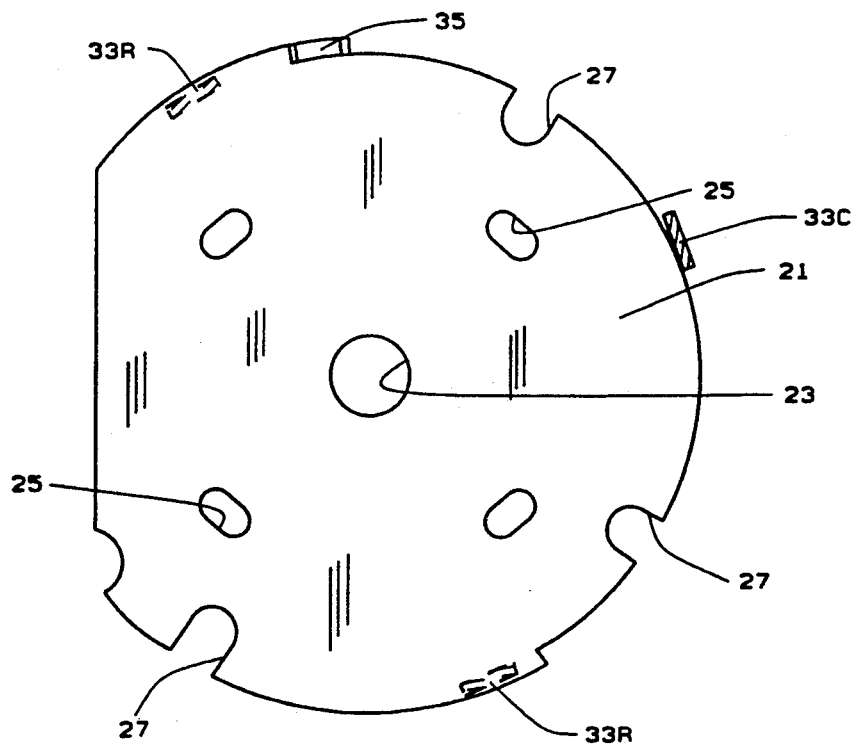
FIG. 8 is a top plan view of the ring yoke index that is secured to the bottom of a carriage for use with the operational interlock to prevent rip cutting, unless the adjustable outfeed user barrier is in a lower engaged position.

As shown in FIG. 7 of the drawings, the rotatably mounted yoke 11 is pivotally mounted to the supporting arm 9 along the pivot axis P. The supporting arm 9 includes a U-shaped track 17 which supports rollers 19, 19 of the carriage (not shown specifically) for moving the entire yoke 11 longitudinally along the length of the track 17, through the use of the rollers 19, 19. A ring yoke index 21, attached to the bottom of the carriage (not shown) is illustrated in FIG. 8 of the drawings. The ring yoke index 21 is a partial circular-shaped element having a central opening 23 for receiving the pivot shaft (not shown) that interconnects the yoke 11 and carriage (not shown) for rotational movement about the pivot axis P, shown in FIG. 7. The ring yoke index 21 also includes a series of oval shaped openings 25 for receiving bolts (not shown) that attach the ring yoke index 21 t o the carriage (not shown). Around the outer periphery of the partial circular-shaped yoke ring index 21, there are three notches 27 for receiving bullet nose pins (not shown) from yoke 11 for locating the yoke 11 in the desired rotational position for rip cutting or cross cutting.

A C-shaped actuator or arm 29 is pivotally mounted at 31 to the yoke 11. The actuator or arm 29 is shown in both full line and phantom line positions in FIG. 7 of the drawings. In the full line illustration, the actuator 29 is in a cross cut position, while the dotted or phantom line position of the actuator 29 shows its position during rip cutting. For ease of identification, 29C identifies the position of the actuator 29 during cross cutting, while 29R shows the dotted or phantom line position of the actuator when in rip cutting position.

The actuator 29 has an upper finger 33 which extends through a slot (not shown) in the yoke 11 in order to allow the finger 33 to extend about or adjacent to the periphery of the circular-shaped ring yoke index 21, as shown in FIG. 8 of the drawings. In FIG. 7 of the drawings, the finger 33 is shown in a full line position 33C and a dotted or phantom line position 33R, representing, respectively, the cross cutting and rip cutting positions of the finger 33. In FIG. 8 of the drawings, the actuator finger 33 is shown in a cross cut position 33C around the circular shaped periphery of the partial circular shaped ring yoke index 21 and in a position below the outer periphery of the partial circular shaped ring yoke index 21, as at 33R in the upper left hand corner of FIG. 8. A cam section 35, integral with the yoke ring index 21, engages the upper end of the finger 33R and forces same downwardly, to the phantom line position, 33R shown in FIGS. 7 and 8. As previously indicated, the actuator 29 pivots about the pivot 31 to move the finger 33 from the full line position 33C, where it is located around the circular periphery of the partial circular shaped yoke ring index 21, to the dotted line position 33R where the cam 35 of the yoke ring index 21 engages the upper end of the finger 33 forcing it downwardly, as shown at 33R in FIGS. 7-8. This causes the actuator 29 to be moved from its full line cross cutting position 29C to its dotted or phantom line rip cutting position 29R.

In the dotted or phantom line position 29R, the actuator ring 29R is moved closer to the radial saw assembly 13, as best shown in FIG. 7 of the drawings. However, it can not be moved to this position unless the adjustable outfeed user barrier is moved into a lower engaged position, as will be subsequently described in connection with FIGS. 9-10 of the drawings. This provides an operational interlock to prevent rip cutting unless the adjustable outfeed user barrier is in the lower engaged position. Note that the actuator ring 29 shows, in its dotted or phantom line illustration, complementary pin and slot means 37, 39, which guide the movement of the actuator 29 as it moves from the full line position 29C to the dotted line position 29R, as will be apparent.

Before discussing the use of the actuator 29 as an operational interlock, it will be necessary to understand the construction of an adjustable outfeed user barrier in the radial saw assembly 13 which cooperates with the actuator 29 in preventing rip cutting, unless the adjustable outfeed user barrier is in a lower engaged position with a workpiece. Thus, reference is now made to FIGS. 2-6 of the drawings, in conjunction with FIG. 7, in order to understand the construction and operation of the radial saw assembly 13.

First of all, it will be noted in FIG. 7 of the drawings that the yoke 11 is constructed to support the motor 41 which includes a shaft 43 for driving a motor driven saw blade 45 at the right hand side of the yoke 11. As explained in the background introduction, the motor driven saw blade 45, when operated for rip cutting or cross cutting purposes, creates substantial safety hazards. In order to overcome the safety hazards, while increasing the operational efficiency of the motor driven saw blade 45, the radial saw assembly 13, as best shown in FIGS. 2-6, has been constructed.

For cross cutting operations, the radial saw assembly 13 is positioned transverse to the worktable mounted fence 15, for cutting workpieces to a desired length. For rip cutting operations, the radial saw assembly is rotated 90° to that shown in FIG. 1 of the drawings, along the pivot axis P (see FIG. 7), in order to operate the radial saw assembly 13 longitudinally along the length of the worktable mounted fence 15, in order to reduce the width of a workpiece. When operated in the position shown in FIG. 1 of the drawings for cross cutting operations, the radial saw assembly is moved along the length of the supporting arm through the engagement of the carriage wheels 19, 19 with U-shaped track member 17, as illustrated in FIG. 7. For rip cutting operations, the radial saw assembly is mounted in a fixed position at a 90° position to that shown in FIG. 1, for hand feeding workpieces into the radial saw assembly 13. During rip cutting, a workpiece kerf is formed in the workpiece on the outfeed side of the radial saw assembly 13. The present invention employs suitable blade guards and user barriers to prevent a user from feeding a workpiece into the radial saw assembly 13 from an outfeed side, while also increasing the operational efficiency of the radial saw assembly 13, as will be explained below.

For a more detailed description and illustration of the radial saw assembly in rip cutting and cross cutting operations, reference is made to the aforementioned copending patent applications which are owned by the same assignee as the present invention.

The radial saw assembly 13 includes an upper blade guard 47 which is configured as illustrated and positioned over approximately an upper half of the motor driven saw blade 45 for protecting a user during rip cutting and cross cutting operations. The upper blade guard 47 includes an exhaust port 49 for the removal of sawdust. The upper blade guard 47 has several important functions. It prevents hand contact with the upper half of the motor driven saw blade 45, while containing sawdust to enable it to be directed out of the sawdust outlet 49. The upper blade guard 47 also provides a mounting means to secure various barrier and hold down components to the radial saw assembly 13.

At the rear or outfeed side of the upper blade guard 47 is a fixed mounting bracket 51, a sliding bracket 53 (see FIGS. 5-6) and a riving knife 55 which is slidably mounted to both the fixed bracket 51 and the sliding bracket 53.

Figure 2:
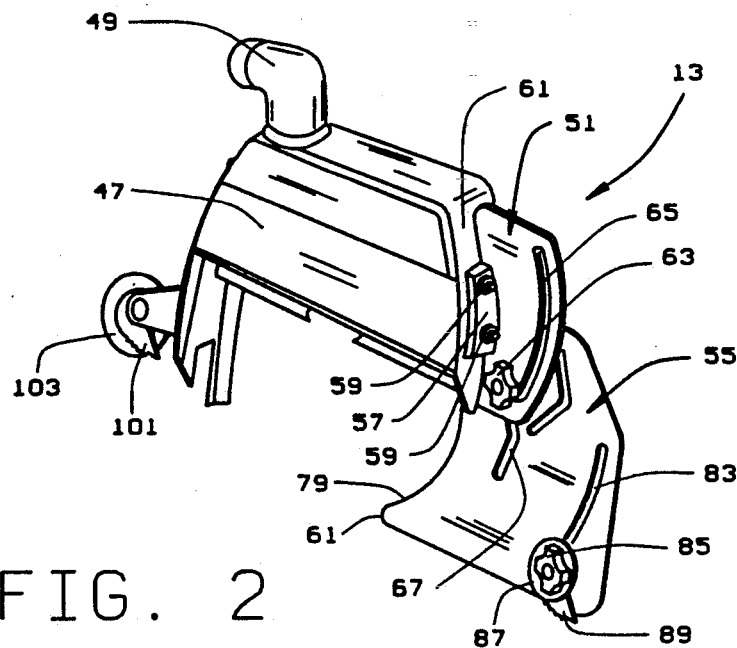
FIG. 2 is an enlarged in size perspective view of the radial arm saw guard of the present invention.
Figure 3:
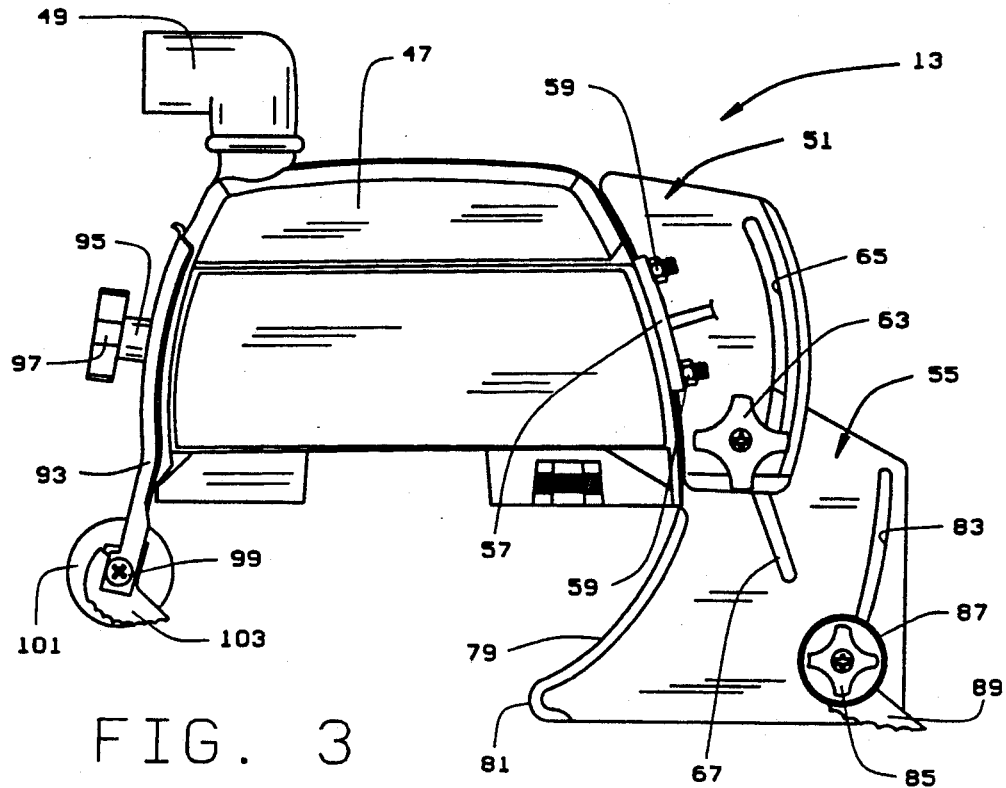
FIG. 3 is a further enlarged in size side elevational view of the radial arm saw guard of the present invention.
Figure 4:
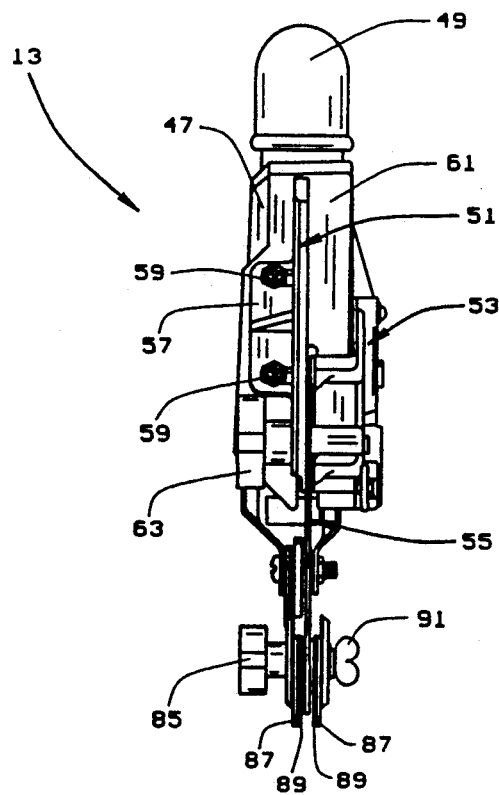
FIG. 4 is an end elevational view of the radial arm saw guard shown in FIG. 3.

The mounting bracket 51 has an integral foot 57 which is secured by fasteners 59, 59 to the rear surface 61 of the upper blade guard 47, as best seen in FIGS. 2-4.

Figure 5:
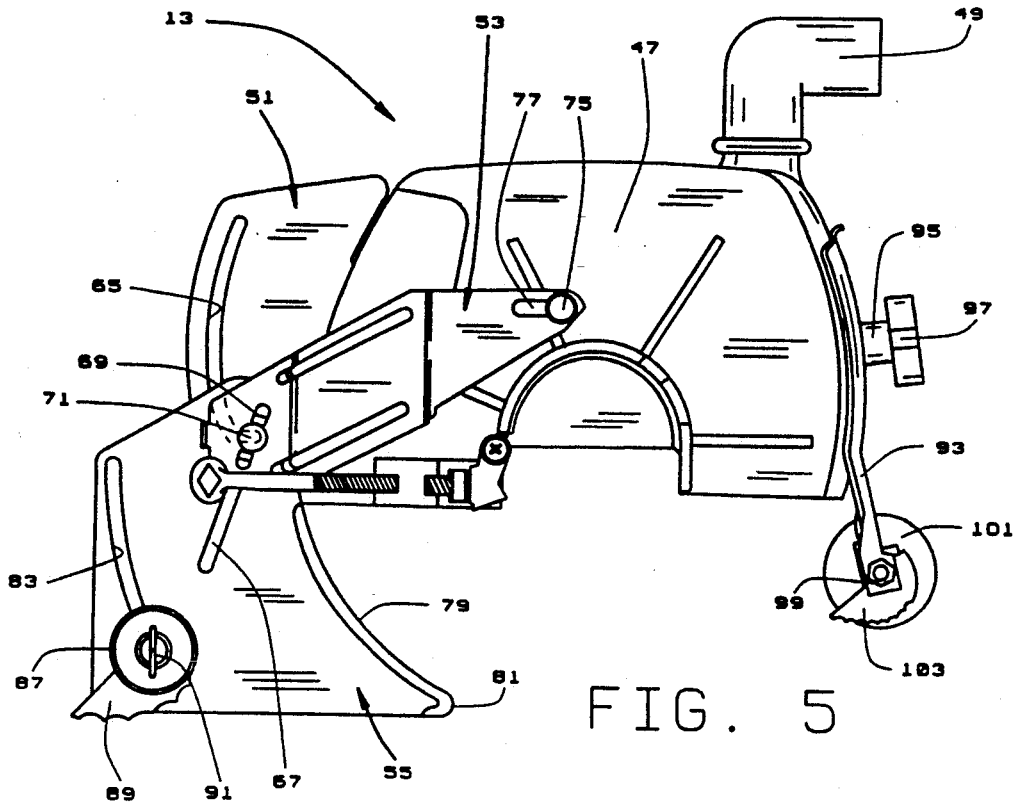
FIG. 5 is a side elevational view of the radial arm saw guard, on an opposite side from that seen in FIG. 3, and illustrating the manner in which the adjustable outfeed user barrier is moved to a lower engaged position relative to the upper fixed blade guard in the radial arm saw guard of the present invention.
Figure 6:
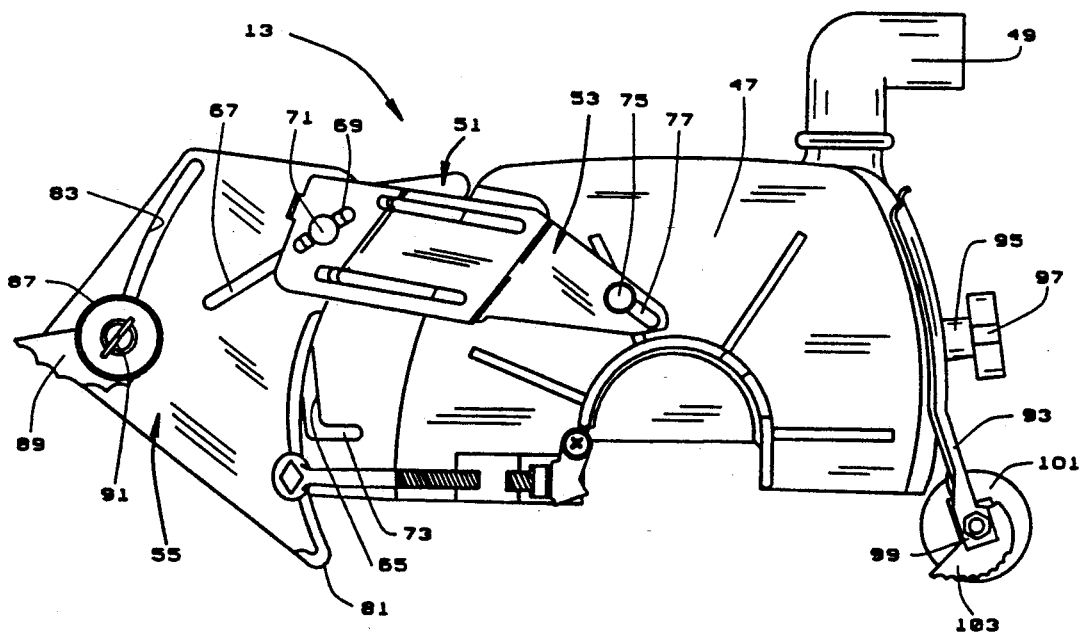
FIG. 6 is a view similar to FIG. 5, but illustrating the adjustable outfeed user barrier in an upper disengaged position during cross cutting.

The riving knife 55 is supported between the fixed mounting bracket 51 and the sliding bracket 53, for movement between a lower engaged position, as shown in FIG. 3 and FIG. 5, where the riving knife 55 is positioned within a workpiece kerf behind the motor driven saw blade 35 during rip cutting, and an upper disengaged position, as shown in FIG. 6, where the riving knife 55 cannot interfere with the workpiece and fence during cross cutting. For this purpose, an adjusting knob 63 is associated with a threaded fastener 71 that extends through an elongated curvilinear slot 65 in the mounting bracket 51, through a downwardly and outwardly extending slot 67 in the riving knife 55, and then through a hole in the sliding bracket 53, as best seen in FIGS. 5-6 of the drawings.

To move the riving knife 55 from its lower engaged position shown in FIG. 5 to its upper disengaged position shown in FIG. 6, the adjusting knob 63 is unloosened, enabling the associated adjusting knob 63 threaded fastener to slide outwardly and then upwardly in the slot 65 from the position shown in FIG. 5 to the position shown in FIG. 6. At that point, the adjusting knob 63 is tightened to secure the riving knife 55 in its upper position. In FIG. 6 of the drawings, it will be noted that the elongated curvilinear slot 65 has an inwardly directed portion 73 which receives the adjusting knob 63 associated threaded fastener when the riving knife is in its lower engaged position, as seen in FIGS. 3 and 5 of the drawings.

When the riving knife 55 is moved from its lower engaged position shown in FIGS. 3 or 5 to its upper disengaged position as shown in FIG. 6, the sliding bracket 53 moves as illustrated in FIGS. 5-6. For this purpose, the shank (not shown) of the enlarged headed stud 75 slidably moves in the elongated slot 77, from one side to the other, enabling the sliding bracket 53 to move from the lower engaged to the upper disengaged position, as shown in FIG. 5 and 6.

The downwardly and outwardly extending slot 67 in the riving knife 55 is also adjustable relative to the sliding bracket 53, in order to enable the riving knife 55 to be adjusted relative to motor driven saw blades 45 of different diameter. As shown in the drawings, the riving knife 55 has an inwardly curved section 79 which terminates at a lower end in an inwardly directed foot 81. The foot 81 is capable of being positioned within a workpiece kerf of a workpiece following the motor driven saw blade 45 during rip cutting. As the riving knife 55 is adjusted through the downwardly and outwardly extending slot 67, the riving knife 55, including its curved inner section 79, moves toward and away from the motor driven saw blades 45 of different diameter, as will be apparent.

At an opposite end of the riving knife 55 from the inner curvilinear section 79 is a second elongated generally vertically directed and curvilinear slot 83 for receiving the threaded shank of a wing bolt 91 that secures a gage roller 87 and an anti-kickback pawl 89 on each side of the riving knife 55, as will be seen in FIGS. 3 and 5. An adjusting knob 85, on the opposite side of the riving knife 55 from the wing bolt 91, secures the gage roller 87 and anti-kickback pawl 89 on each side of the riving knife 55. The anti-kickback pawls 89, 89, on each side of the riving knife 55, are designed to engage a workpiece on opposite sides of a workpiece kerf in which the riving knife 55 is positioned. The gage rollers 87, 87 assist the user in setting the anti-kickback pawl 89, 89 in proper position relative to a workpiece. Thus, the gage rollers 87 will engage an upper surface of a workpiece, in order to properly set the anti-kickback pawls 89, 89 for also engaging an upper surface of the workpiece, on opposite sides of the workpiece kerf in which the riving knife 55 is positioned. It will be appreciated that the adjusting knob 85 enables the gage rollers 87, 87 and anti-kickback pawls 89, 89 to be moved upwardly relative to the generally vertically directed and curvilinear elongated slot 83 at the rear of the riving knife 55, for accommodating workpieces of different thickness.

At an infeed end of the radial saw assembly 13, there is provided a hold down 93 including a slidable bracket having an elongated slot (not shown) for receiving the shank 95 of the adjusting knob 97, in order to adjustably position the hold down 93 relative to workpieces of different thickness. At the lower end 99 of the hold down, there is a gage roller 101 with a pair of anti-kickback pawls 103, 103 on opposite sides thereof. The gage roller 101 and anti-kickback pawls 103, 103 operate in the same manner as the gage rollers 87, 87 and anti-kickback pawls 89, 89 of the riving knife 55, for engaging an upper surface of a workpiece at an infeed end of the radial saw assembly 13.

Figure 9:
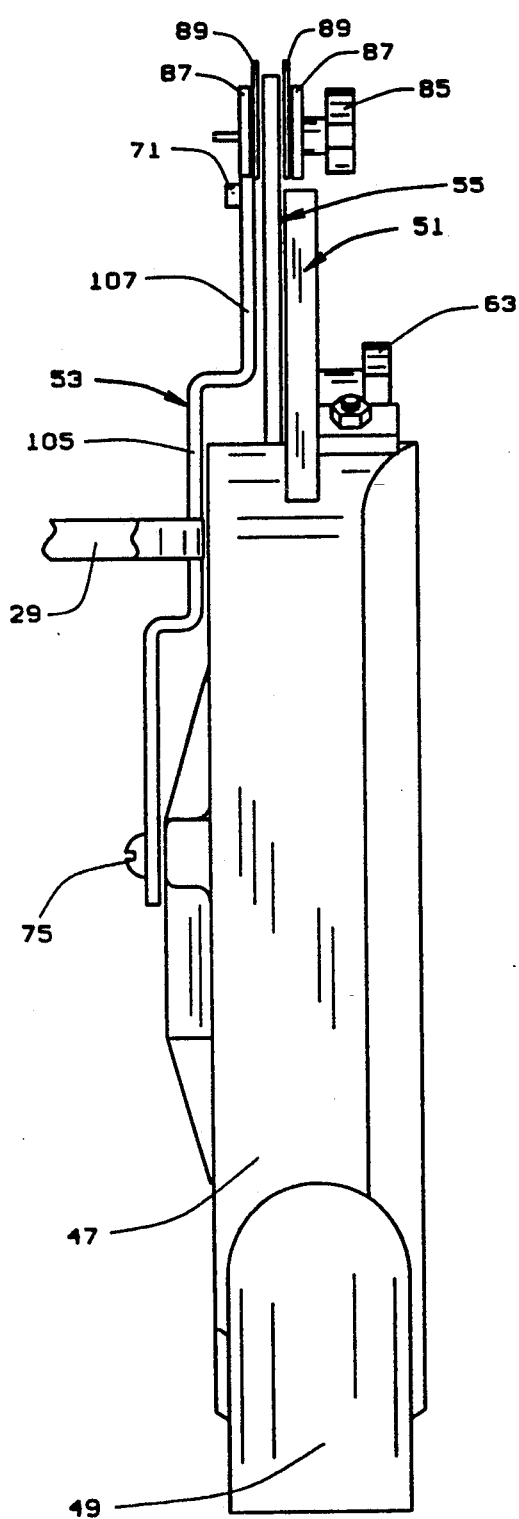
FIG. 9 is an enlarged fragmentary top plan view of the radial arm saw guard when the adjustable outfeed user barrier is in a lower engaged position with the workpiece to prevent engagement with an operational interlock.
Figure 10:
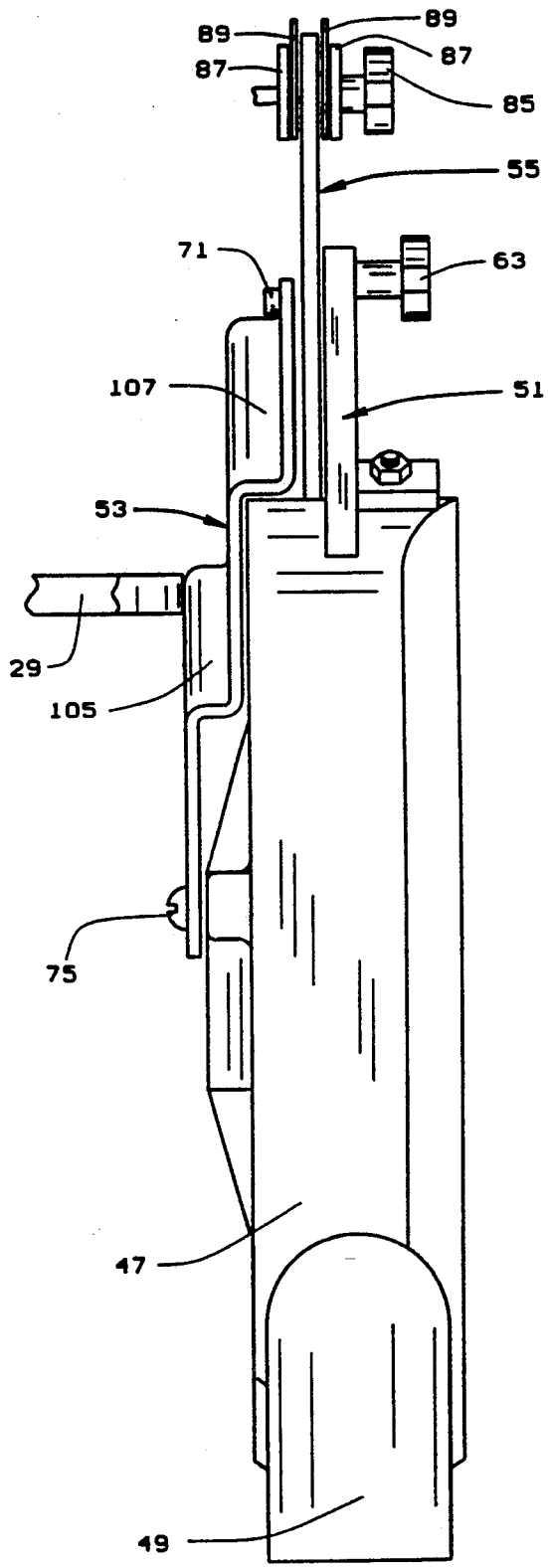
FIG. 10 is a view similar to FIG. 9, but illustrating the adjustable outfeed user barrier in an upper disengaged position for engagement with the operational interlock to prevent rip cutting by the radial saw.

As previously discussed, the radial saw assembly 13 of the present invention includes an operational interlock that cooperates with the actuator arm 29 that is pivotally mounted to the yoke 11, as shown in FIG. 7 of the drawings. In FIGS. 9–10 of the drawings, the actuator arm 29, engages or disengages the sliding bracket 53, depending on whether the sliding bracket 53 is in an upper disengaged or lower engaged position with respect to the riving knife 55. More specifically, the sliding bracket 53 includes first and second step sections 105, 107, between opposite ends of the sliding bracket 53. When the sliding bracket is in an upper disengaged position, along with the riving knife 55, the actuator arm 29 engages the first step shoulder 105 in binding engagement. This prevents the yoke 11 from rotating about the pivot axis P.

As previously described in connection with FIG. 7 of the drawings, the actuator arm 29 is moved outwardly to a position 29R when the upper end 33 of the actuator 29 is engaged by the yoke ring index 21, causing the upper end 33 to be moved downwardly to its position 33R, which causes the actuator arm 29 to pivot about the pivot 31, so as to be moved to its most outward position at 29R, as shown in FIG. 7 of the drawings. Thus, when the sliding bracket 53 is in an upper disengaged position, the actuator arm 29 will engage the first step section 105 of the sliding bracket 53 in binding engagement, as shown in FIG. 10, thus preventing the actuator arm 29 from moving outward to position 29R and preventing the upper end 33 of the actuator 29 from passing under the cam 35 portion of the yoke index 21 and thereby preventing the yoke 11 from being moved to a rip cutting position. In FIG. 9 of the drawings, the sliding bracket 53, including the riving knife 55 has been previously moved to a lower engaged position with the workpiece, and thus, there can be no binding interference with the actuator arm 29. This enables the yoke 11 to be moved to a rip cutting position for the radial saw assembly 13, including the positionment of the motor driven saw blade 45 longitudinally relative to the worktable mounted fence 15.

It will thus be seen that the present invention provides an operational interlock that prevents rip cutting by the motor driven saw blade 45 unless the adjustable outfeed user barrier, including the sliding bracket 53 and the riving knife 55, are moved to a lower engaged position relative to a workpiece. In an upper disengaged position as shown in FIG. 10 of the drawings, interference will occur between an actuator arm 29 pivotally mounted on a rotatable yoke 11, causing binding interference between the upper end 33 of the acutator 29 and the cam 35 of the yoke index 21 thus preventing the yoke 11 and associated motor driven saw blade 45 from being moved to a rip cutting position.

In addition to the operational interlock, the radial saw of the present invention includes an adjustable outfeed user barrier including a riving knife that is adjustable relative to motor driven saw blades of different diameter. The riving knife, at an outfeed end, may be provided with suitable anti-kickback pawls and gage rollers, while an adjustable hold down may be provided at an infeed end, also with anti-kickback pawls and gage rollers at the lower end of the adjustable hold down.

All of the aforementioned features and elements of the radial saw provides increased safety and operational efficiency to minimize the exposure to hazards and risks associated in the operation of the radial saw.

In view of the above, it will be seen that several objects and features of this invention are achieved and other advantageous results obtained.

As various changes could be made in the above constructions, without departing from the scope of the invention, it is intended that all matter contained in the above description or shown in the accompanying drawings shall be interpreted as illustrative and not in a limiting sense.

We claim:

1. A radial saw for rip cutting and cross cutting workpieces comprising:
    a motor driven saw blade mounted on a yoke depending from a supporting arm that overhangs a worktable, said motor driven saw blade being movable relative to a worktable mounted fence to enable said motor driven saw blade to be operated for rip cutting of workpieces longitudinally relative to the fence and for cross cutting transverse relative to the fence;
    a blade guard mounted in fixed position relative to said yoke mounted motor driven saw blade for covering at least approximately an upper half of the motor driven saw blade;
    adjustable outfeed user barrier means mounted to said upper blade guard for operation between an upper disengaged position exposing the motor driven saw blade and a lower engaged position covering an outfeed end of the motor driven saw blade to protect a user during rip cutting; and
    interlock means for preventing rip cutting by the motor driven saw blade unless the adjustable outfeed user barrier means is in its lower engaged position.

2. The radial saw as defined in claim 1 wherein the adjustable outfeed user barrier means engages the interlock means to prevent rip cutting by the motor driven saw blade.

3. The radial saw as defined in claim 2 wherein the yoke is rotatably mounted to the supporting arm for rip cutting and cross cutting operations by said motor driven saw blade, and said interlock means includes an actuator arm pivotally mounted on said yoke that is positioned to engage said adjustable outfeed user barrier means when located in an upper disengaged position to prevent rotation of said yoke to a position that enables rip cutting by said motor driven saw blade.

4. The radial saw as defined in claim 3 wherein the actuator arm is moved toward the adjustable outfeed user barrier means when the yoke is rotated for rip cutting and away from the adjustable outfeed user barrier means when the yoke is rotated for cross cutting.

5. The radial saw as defined in claim 4 wherein the actuator arm is pivotally mounted to said yoke and is moved toward and away from said adjustable outfeed user barrier means by cam means associated with said yoke upon rotation thereof.

6. The radial saw as defined in claim 5 wherein the actuator arm is curved to accommodate a range of bevel angles for the motor driven saw blade.

7. The radial saw as defined in claim 6 wherein the adjustable outfeed user barrier means includes a riving knife adjustably mounted to said fixed blade guard.

8. The radial saw as defined in claim 7 wherein said riving knife is adjustable relative to a mounting bracket secured to said fixed blade guard, said mounting bracket including an elongated slot having a fastener extending therethrough which is mounted to said fixed blade guard for adjustably positioning the riving knife within a workpiece kerf behind the motor driven saw blade during rip cutting.

9. The radial saw as defined in claim 8 wherein said riving knife includes an elongated slot that extends downwardly and away from said motor driven saw blade, said downwardly and outwardly extending riving knife elongated slot also having said fastener extending therethrough for adjusting the riving knife relative to motor driven saw blades of different diameter.

10. The radial saw as defined in claim 9 wherein said riving knife further includes a second elongated generally vertically directed and curvilinear slot for receiving outfeed anti-kickback pawls on opposite sides of said riving knife, said outfeed anti-kickback pawls being mounted on a fastener extending through said secured elongated slot for adjustably positioning said second anti-kickback pawls relative to workpieces of different thickness.

11. The radial saw as defined in claim 10 wherein the outfeed anti-kickback pawls are operatively associated with a gage roller for assisting in positioning the outfeed anti-kickback pawls on a workpiece.

12. The radial saw as defined in claim 11 and including an adjustable hold down mounted to said fixed blade guard opposite to said riving knife, said adjustable hold down being adjustably positioned relative to workpieces of different thickness.

13. The radial saw as defined in claim 12 wherein the adjustable hold down includes an elongated slot which cooperates with a fastener extending therethrough and mounted to said fixed blade guard for the adjustable positioning that is desired.

14. The radial saw as defined in claim 13 wherein the adjustable hold down at a lower end thereof includes infeed anti-kickback pawls to assist in preventing a workpiece from being thrown back toward the user.

15. The radial saw as defined in claim 14 wherein the adjustable hold down is configured to receive and collect sawdust for carrying same upwardly into the fixed blade guard for removal through an exhaust port in said fixed blade guard.

* * * * *